United States Patent

Katagiri et al.

[11] Patent Number: 5,970,269
[45] Date of Patent: Oct. 19, 1999

[54] CAMERA WITH LOW-FRICTION ELASTIC INSERT ON COVER

[75] Inventors: Moriya Katagiri; Yoshiyuki Kitahara, both of Tokyo, Japan

[73] Assignee: Olympus Optical Co., Ltd., Tokyo, Japan

[21] Appl. No.: 09/116,758

[22] Filed: Jul. 16, 1998

[30] Foreign Application Priority Data

Jul. 18, 1997 [JP] Japan .................................. 9-194144

[51] Int. Cl.⁶ .................................................. G03B 17/02
[52] U.S. Cl. ............................................................ 396/537
[58] Field of Search ..................... 396/535, 536, 396/537, 538

[56] References Cited

U.S. PATENT DOCUMENTS 4,334,751 6/1982 Jinsenji et al. ........................... 396/536
5,842,072 11/1998 Zander et al. ...................... 396/537 X

FOREIGN PATENT DOCUMENTS 60-78028 5/1985 Japan .
61-132823 8/1985 Japan .

*Primary Examiner*—Howard B. Blankenship
*Attorney, Agent, or Firm*—Louis Weinstein

[57] ABSTRACT

A camera comprises a camera body, a film Patrone stowage chamber defined in the camera body, a cover member to be freely opened or closed relative to the camera body, an elastic member that is attached to the cover member, and that when the cover member is closed relative to the camera body, is opposed to the film Patrone chamber, and a low-friction member that is attached to the elastic member, and that when the cover member is closed with the film Patrone mounted in the film Patrone stowage chamber, meets at least part of the film Patrone so as to press and slide the film Patrone.

16 Claims, 3 Drawing Sheets

CAMERA WITH LOW-FRICTION ELASTIC INSERT ON COVER

BACKGROUND OF THE INVENTION

1. Field of the Invention

The present invention relates to a camera, or more particularly, a camera having a means for locating a Patrone, which is mounted in a Patrone stowage chamber in a camera body, at a given position.

2. Description of the Related Art

A compact camera adapted to a 35-mm film Patrone (hereinafter simply a Patrone) in which a roll film for photography of 35 mm wide is wound and stowed has prevailed in the past.

When photography is carried out using such a compact camera, a Patrone having an unexposed film stowed therein is mounted in a camera body in advance. The procedure usually adopted will be described below.

That is to say, first, a back cover pivoted to the backside of the camera body so that it can be opened or closed freely is left open. The Patrone is stowed in a film Patrone stowage chamber (hereinafter a Patrone stowage chamber) located at one lateral end in the camera body. A film tip is pulled out of the Patrone, and arranged at a given position in the camera body. The back cover is then closed. Thus, mounting the Patrone in the camera body is completed, and the camera is set to a photography-ready state.

However, although the Patrone is not mounted in a normal state in the Patrone stowage chamber, the back cover may be closed. In this case, the film tip pulled out of the Patrone is not wound normally in a film wind chamber located at the other lateral end in the camera body. Imperfect film feed causing a film jam or the like may occur. Otherwise, since the back cover is not closed perfectly, a gap may be created between the camera body and back cover. This poses a problem that a film may be exposed because of light leakage through the gap.

A means for positioning a Patrone to be mounted in a normal state in a camera body has been proposed in, for example, Japanese Unexamined Utility Model Publication No. 60-78028.

In the Japanese Unexamined Utility Model Publication No. 60-78028, a proposal is made for a camera in which an elastic member attached to a back cover presses the outer circumference of a Patrone in the course of closing the back cover in order to bring the Patrone stowed in a Patrone stowage chamber to a steady posture of a normal state.

By contrast, in Japanese Unexamined Utility Model Publication No. 61-132823 or the like, another camera has been proposed and put to practical use in recent years. In the camera, an opening is formed at a position on the back cover of the camera opposed to a Patrone stowage chamber. A check window formed with a transparent member or the like is created in the opening so that whether or not a Patrone is mounted in a camera body can be checked through the check window. When a Patrone is mounted, information written at a given position on the outer circumference of the Patrone, that is, character information such as a type of film and film speed concerning a film stowed in the Patrone can be checked through the check window.

Like the camera disclosed in the Japanese Unexamined Utility Model Publication No. 61-132823, when a check window is created in a back cover, there arises a problem that unnecessary light invades into a camera body through the check window, and a film loaded in the camera body is exposed.

For preventing this problem, a light interceptive member such as an elastic foaming member is located near the opening in the back cover. When the back cover is closed relative to the camera body, the light interceptive member meets and presses part of the outer circumference of a Patrone mounted in the camera body. Thus, the light interceptive member intercepts light from entering through a gap between the opening in the back cover and the Patrone. This results in a lighttight state.

Moreover, the light interceptive member such as an elastic foam member fills the role of holding a mounted Patrone at a given position with the back cover closed.

However, according to the means disclosed in the Japanese Unexamined Utility Model Publication No. 60-78028, a component such as an elastic member is needed to hold a Patrone in a steady posture in the camera body. This leads to an increase in manufacturing cost. Moreover, a space is required for stowing the component such as an elastic member in the camera body. This poses a problem that the camera becomes large.

On the other hand, according to the means disclosed in the Japanese Unexamined Utility Model Publication No. 61-132823, there is a problem. Specifically, when a Patrone is stowed in the Patrone stowage chamber, although the Patrone is not mounted in a normal state but a film feed port of the Patrone is floating above a given position, the back cover may be closed. In this case, when the outer circumference of the Patrone and the elastic foam member meet in the course of closing the back cover, the back cover would be closed with the feed port of the Patrone floating because of the operation of frictional force. In this case, the back cover is not closed perfectly. This poses a problem of light leakage. through a gap between the camera body and back lid.

SUMMARY OF THE INVENTION

A major object of the present invention is to provide a camera in which: when a Patrone is mounted in a Patrone stowage chamber in a camera body, even if the Patrone is not mounted in a normal state, the Patrone is positioned in a normal state in the course of closing a back cover, and thus mounted reliably in the camera body; and imperfect film feed and light leakage through a gap between the camera body and back cover are prevented.

Another object of the present invention is to provide a camera making it possible to position a Patrone in a normal state and mount it reliably in a camera body while realizing space saving without use of a particularly complex mechanism, and contributing to minimization of manufacturing cost and compactness in design of a camera body.

Briefly, according to the present invention, a camera comprises a camera body, a film Patrone stowage chamber defined in the camera body, a cover member to be freely opened or closed relative to the camera body, an elastic member attached to the cover member and opposed to the film Patrone stowage chamber when the cover member is closed relative to the camera body, and a low-friction member attached to the elastic member, and when the cover member is closed with a film Patrone mounted in the film Patrone stowage chamber, meeting at least part of the film Patrone so as to press and slide the film Patrone.

These and other features of the present invention and the advantages thereof will be apparent from the description below.

According to the present invention, when a Patrone is mounted in a Patrone stowage chamber in a camera body, even if the Patrone is not stowed in a normal state, the Patrone is rotated for position correction and located at a normal-state position in the course of closing a back cover owing to an elastic member and sheet member. Thus, the Patrone is mounted reliably in the camera body. Consequently, there is provided a camera in which imperfect film feed or light leakage through a gap between the camera body and back cover is prevented.

Moreover, the Patrone can be located at the normal-state position without use of a particularly complex mechanism, and mounted reliably in the camera body. Consequently, there is provided a camera realizing space saving in the camera body, contributing to compactness in design of a camera, and realizing minimization of manufacturing cost.

DESCRIPTION OF THE PREFERRED EMBODIMENTS

Figure 1:
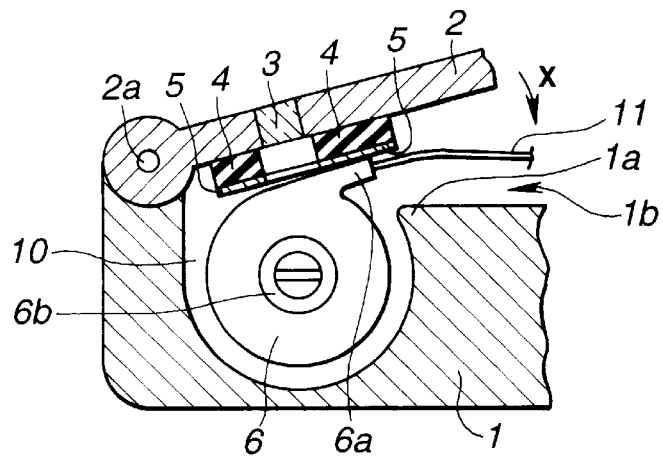
FIG. 1 is a sectional view of a major portion near a Patrone stowage chamber in a camera of the first embodiment of the present invention, showing a state in which a back cover is being closed after a film Patrone is mounted.
Figure 2:
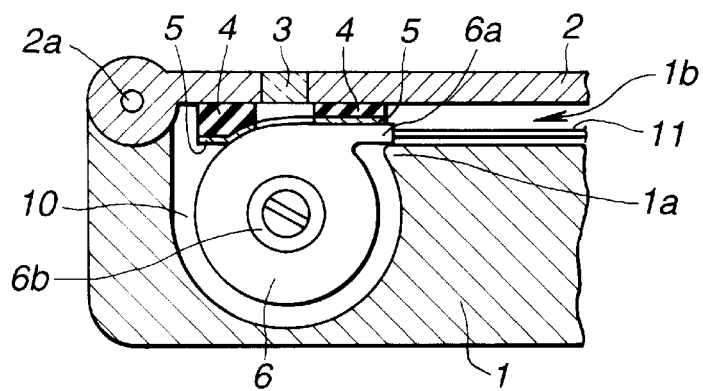
FIG. 2 is a sectional view of the major portion near the Patrone stowage chamber in the camera shown in FIG. 1, showing a state in which the back cover has been closed.
Figure 3:
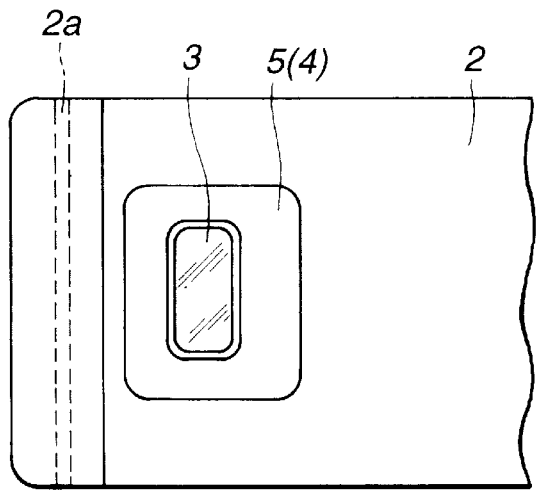
FIG. 3 is a back view of a major portion of the back cover showing a film information check window in the back cover of the camera shown in FIG. 1.

FIGS. 1 and 2 are sectional views of a major portion near a Patrone stowage chamber in a camera of the first embodiment of the present invention. FIG. 1 shows a state in which a back cover is being closed after a film Patrone is mounted. FIG. 2 shows a state in which the back cover has been fully closed. FIG. 3 is a back view of a major portion of the back cover showing a film information check window in the back cover of the camera. The camera of this embodiment is a camera adapted to a photographic film of 35 mm wide to be stowed in a 35-mm film Patrone.

As shown in FIGS. 1 and 2, a film Patrone stowage chamber 10 in which a film Patrone 6 is stowed is located at one lateral end in a camera body 1. A drive shaft (not shown) coupled with a driving mechanism (not shown) located in the camera body 1 juts upwardly from the bottom of the Patrone stowage chamber 10 toward the interior of the Patrone stowage chamber 10.

A Patrone shaft 6b is borne in a Patrone 6 to be stowed in the Patrone stowage chamber 10 so that the Patrone shaft can rotate freely. A roll photographic film 11 of 35 mm width is wound about the Patrone shaft 6b and stowed in the Patrone. The tip of the film is exposed by a given length beyond projection 6a.

When the Patrone 6 is stowed in the Patrone stowage chamber 10, the drive shaft is fitted into a hollow bored in one side of the Patrone shaft 6b. Thus, the Patrone 6 is positioned in the Patrone stowage chamber 10. When the drive shaft rotates inside the Patrone shaft 6b, the film 11 is rewound into the Patrone 6.

Moreover, a substantially plate-like back cover 2 has one lateral end thereof pivoted by a support shaft 2a on the backside of the camera body 1 so that the back cover 2 can pivot freely. By opening or closing the back cover 2, the back cover is displaced from a closed state (state shown in FIG. 2), in which an opening in the backside of the camera 1 is hidden, into an open state (state shown in FIG. 1), in which the opening is uncovered, or vice versa. When the back cover 2 is further turned to be more widely open than it is in the state shown in FIG. 1, the Patrone 6 can be mounted in the Patrone stowage chamber 10.

An opening is formed as part of the back cover 2 at a position at which the opening is opposed to the Patrone stowage chamber 10 when the back cover 2 is closed. A film information check window 3 formed with a transparent member or the like is created in the opening. Whether or not the Patrone 6 is present in the Patrone stowage chamber 10, or information written on the outer circumference of the mounted Patrone 6, for example, film information such as a type of film, a film speed, and the rated number of pictures can be checked through the film information check window 3.

Moreover, an elastic member 4 that is a light interceptive member such as an elastic foaming material foam or elastic member is, as shown in FIG. 3, placed on the perimeter of the film information check window 3 on the inner wall surface of the back cover 2 which is opposed to the Patrone stowage chamber 10. Thus, when the back cover 2 is closed, the elastic member 4 is interposed between the back cover 2 and the mounted Patrone 6 in order to intercept light incident through the film information check window 3.

Furthermore, a sheet type low-friction member offering a lower friction coefficient than the surface of the elastic member 4, for example, a sheet member 5 made of polyester or Teflon (trademark) is bonded to the surface of the elastic member 4 that meets the outer circumference of the Patrone in the course of closing the back cover 2.

After the Patrone 6 is stowed in the Patrone stowage chamber 10, the sheet member 5 abuts on the outer circumference of the Patrone 6 in the course of closing the back cover 2. When the back cover 2 is further turned to be more narrowly closed, the sheet member 5 and elastic member 4 press the Patrone 6. This causes the Patrone 6 and sheet member 5 to slide relative to each other, and the Patrone 6 to rotate.

The elastic member 4 that is an elastic foaming material and the sheet member 5 that is a low-friction member are both colored in black in order to exert the ability to intercept light. A generally employed sponge colored in black may therefore be substituted for the elastic member 4.

Moreover, a stowed position at which the Patrone 6 is stowed in a normal state in the Patrone stowage chamber 10 is, as shown in FIG. 2, a position at which a projection 6a of the Patrone 6 in which a film feed port is bored abuts on a jut 1a formed at an edge of the inner wall of the Patrone stowage chamber 10 in the camera body 1. When the Patrone 6 is mounted at the normal-state position shown in FIG. 2, the film 11 to be stowed in the Patrone 6 and fed through the film feed port runs smoothly along a film feed path 1b in the camera body 1. The film 11 is fed toward a film wind chamber (not shown) located at the other lateral end in the camera body 1.

The operation of the camera of the first embodiment having the foregoing structure, which is exerted when the Patrone 6 is mounted in the camera body 1, will be described below.

To begin with, the Patrone 6 is mounted in the Patrone stowage chamber 10 in the camera body 1 with the back cover 2 left open. At this time, ideally, the Patrone 6 is stowed at a position at which the projection 6a abuts on the jut 1a in the camera body 1, that is, at the normal-state position. However, the Patrone 6 may be stowed with the projection 6a of the Patrone 6 not, as shown in FIG. 2, abutting on the jut 1a in the camera body 1, that is, with the projection 6a floating, as shown in FIG. 1. Nevertheless, in the camera of this embodiment, the Patrone 6 is rotated for position correction owing to the elastic member 4 and sheet member 5 in the course of closing the back cover 2. Thus, the Patrone 6 is located at the normal-state position, and reliably mounted in the Patrone stowage chamber 10.

Assume that the Patrone 6 is stowed in the Patrone stowage chamber 10 with the projection 6a of the Patrone 6 floating apart from the jut 1a in the camera body 1. In this state, if the back cover 2 is turned in the direction of an arrow X in FIG. 1, the sheet member 5 abuts on the outer circumference of the projection 6a of the Patrone 6. This state is the state shown in FIG. 1.

The back cover 2 is further turned in the direction X and thus brought to a state close to the closed state shown in FIG. 2. This causes the back cover 2 to press the outer circumference of the Patrone 6 via the sheet member 5 and elastic member 4. A frictional resistance occurring between the sheet member 5 and the outer circumference of the Patrone 6 is, as mentioned above, set to a low value. The Patrone 6 and sheet member 5 therefore slide relative to each other. Meanwhile, the Patrone 6 rotates clockwise (in FIG. 1). This causes the projection 6a of the Patrone 6 to abut on the jut 1a in the camera body 1. Consequently, the Patrone 6 is located at the normal-state position. At the same time, the back cover is brought to the fully closed state (state shown in FIG. 2).

In this state, the elastic member 4 is pressed to the outer circumference of the Patrone 6. The gap between the film information check window 3 and the outer circumference of the Patrone 6 becomes lighttight. Consequently, light leakage through the film information check window 3 is prevented.

As mentioned above, according to the first embodiment, the sheet member 5 that is a low-friction member offering a lower friction coefficient than the surface of the elastic member 4 is merely bonded in a united fashion to the surface of the elastic member 4 that is a light interceptive member interposed between the back cover 2 and the outer circumference of the Patrone 6 mounted in the Patrone stowage chamber 10 for preventing light leakage through the film information check window 3 and for holding the Patrone 6 in the normal mounted state. Nevertheless, when the Patrone 6 is mounted, even if the Patrone 6 is not stowed in the normal mounted position, the Patrone 6 can be mounted at the normal position in the course of closing the back cover 2. The Patrone 6 can therefore be reliably mounted in the camera body 1. Consequently, imperfect feed causing a film jam or the like, light leakage through the gap between the camera body 1 and back cover 2, or the like can be prevented.

Moreover, there is no need for any particularly complex mechanism. The space in the camera body 1 will therefore not be wasted. This embodiment contributes to compactness in design of the camera body, and to minimization of manufacturing cost.

Next, the second embodiment of the present invention will be described below.

Figure 4:
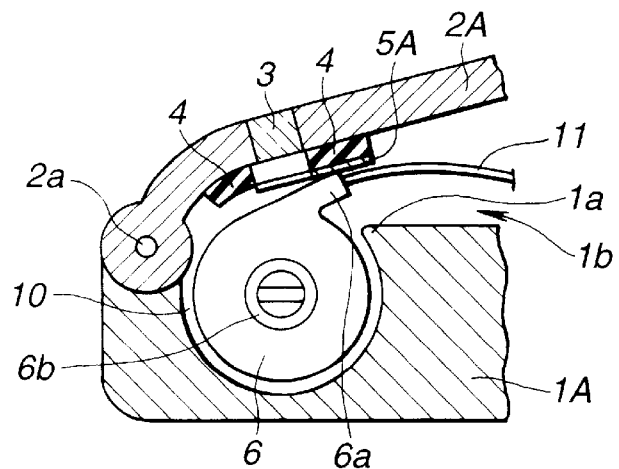
FIG. 4 is a sectional view of a major portion near a Patrone stowage chamber in a camera of the second embodiment of the present invention, showing a state in which a back cover is being closed after a film Patrone is mounted.
Figure 5:
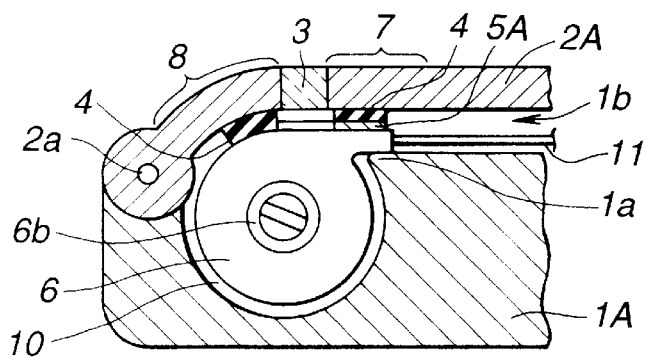
FIG. 5 is a sectional view of the major portion near the Patrone stowage chamber in the camera shown in FIG. 4, showing the closed state of the back cover.
Figure 6:
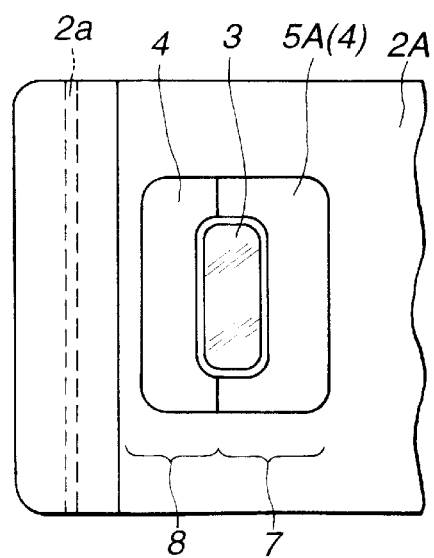
FIG. 6 is a back view of a major portion of the back cover showing a film information check window in the back cover of the camera shown in FIG. 4.

FIGS. 4 and 5 are sectional views of a major portion near a Patrone stowage chamber in a camera of the second embodiment of the present invention. FIG. 4 shows a state in which a back cover is being closed after a film Patrone is mounted. FIG. 5 shows a closed state of the back cover. Moreover, FIG. 6 is a back view of a major portion of the back cover showing a film information check window in the back cover of the camera. The second embodiment has fundamentally the same structure as the aforesaid first embodiment. However, the shape of the back cover 2 is a little different from that of the first embodiment. The same reference numerals will therefore be assigned to the members identical to those of the first embodiment. The description of the members will be omitted.

Like the back cover 2 of the first embodiment, a back cover 2A of a camera of this embodiment is pivoted by one lateral end of the backside of a camera body 1A so that the back cover can pivot freely. By opening or closing the back cover 2A, the back cover is displaced from a closed state (state shown in FIG. 5), in which the opening in the backside of the camera body 1a is hidden, into an open state (state shown in FIG. 4), in which the opening is uncovered, or vice versa.

A position at which the support shaft 2a of the camera body 1A is located is a position on one extreme portion of the camera body that is formed to have a thickness slightly smaller than the thickness (a dimension in a direction orthogonal to a direction in which a film is fed) of the center portion of the camera body 1A. The back cover 2A is shaped substantially like a plate similar to the back cover 2 of the first embodiment. However, a given portion of the back cover 2A near the support shaft 2a is, as shown in FIG. 5, substantially curved so that it will be streamlined along the outer circumference of the mounted Patrone 6 when the back cover 2A is closed. Consequently, the opening in the backside of the camera body 1A is hidden behind the back cover 2A.

Moreover, the back cover 2A is provided with the film information check window 3 similar to the one of the first embodiment. The elastic member 4 such as an elastic foaming material is bonded to the inner wall surface of the back cover 2A opposed to the Patrone stowage chamber 10 over an area from a curved portion 8 of the back cover 2A to a planar portion 7 thereof (See FIGS. 5 and 6) on the perimeter of the film information check window 3.

A sheet member 5A that is a sheet-type low-friction member offering a lower friction coefficient than the surface of the elastic member 4 is bonded in a united fashion only to the surface of the elastic member 4 that meets the outer circumference of the projection 6a of the Patrone 6 in the course of closing the back cover 2A, that is, only to the surface of the planar portion 7 of the back cover 2A.

To begin with, the sheet member 5A is bonded to the surface of the elastic member 4 during a machining and manufacturing process. Thereafter, the elastic member 4 is bonded to the given position on the inner wall surface of the back cover 2A.

Assume that the inner wall surface of the back cover 2 to which the elastic member 4 is bonded is substantially planar like the one of the first embodiment. In this case, wrinkles or the like will not occur on the surface of the sheet member 5 at the time of bonding the elastic member 4 to the inner wall surface of the back cover 2. By contrast, assume that the back cover 2 has the curved portion 8 like the back cover 2A of this embodiment. In this case, even when the elastic member 4 having the sheet member 5 bonded to the whole surface thereof in a united fashion is bonded to the inner wall surface of the back cover 2A over the area from the curved portion 8 to the planar portion 7, wrinkles or the like may occur on the surface of the sheet member 5 lying on the surface of the elastic member 4. Light leakage may stem from the wrinkles.

In consideration of the above point, according to this embodiment, a bonded position of the sheet member 5A is only a position on the surface of the elastic member 4 lying over the planar portion 7. The other components are identical to those of the first embodiment.

The operation and advantages of the second embodiment having the foregoing structure are identical to those of the first embodiment.

Figure 7:
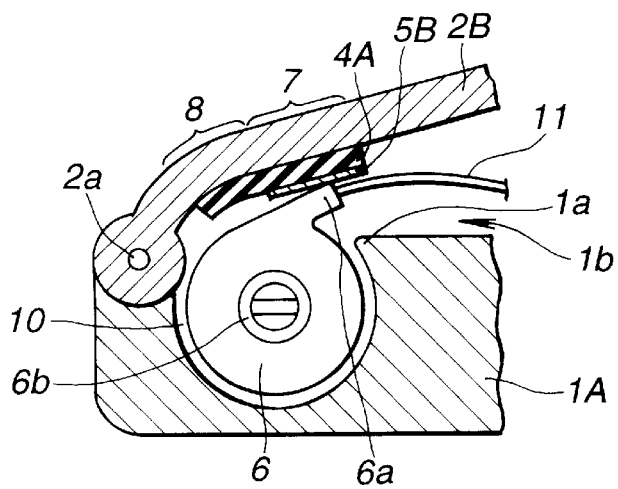
FIG. 7 is a sectional view of a major portion near a Patrone stowage chamber in a camera of the third embodiment of the present invention, showing a state in which a back cover is being closed after a film Patrone is mounted.
Figure 8:
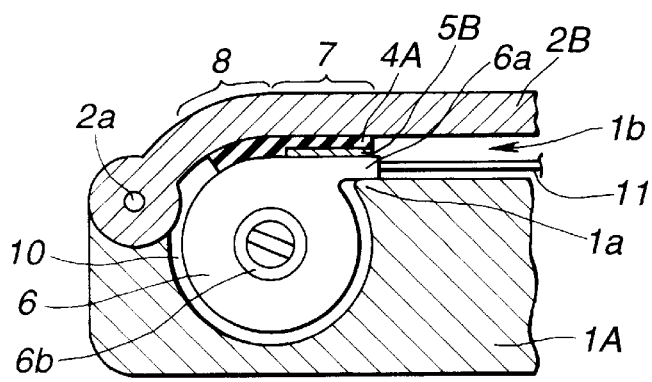
FIG. 8 is a sectional view of the major portion near the Patrone stowage chamber in the camera shown in FIG. 7.
Figure 9:
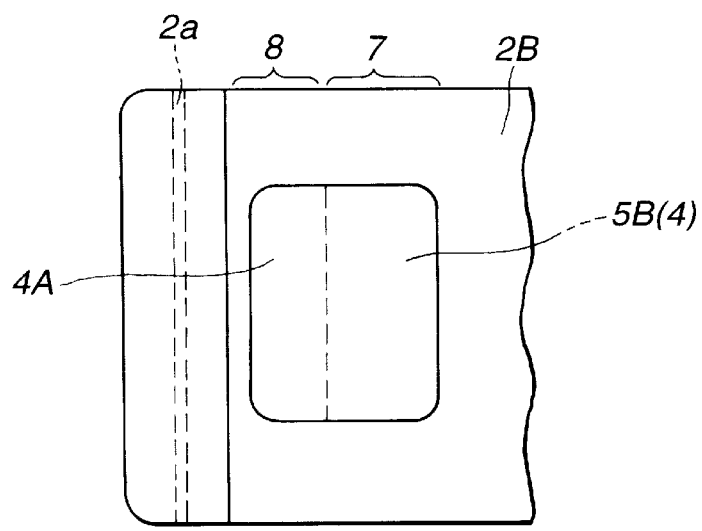
FIG. 9 is a back view of a major portion of the back cover showing areas in the back cover of the camera shown in FIG. 7 to which an elastic member and sheet material are bonded.

FIGS. 7 and 8 are sectional views of a major portion near a Patrone stowage chamber in a camera of the third embodiment of the present invention. FIG. 7 shows a state in which a back cover is being closed after a film Patrone is mounted. FIG. 8 shows a closed state of the back cover. Moreover, FIG. 9 is a back view of a major portion of the back cover showing areas in the back cover of the camera to which an elastic member and sheet member are attached. The third embodiment has fundamentally the same structure as the second embodiment. A difference of this embodiment lies in a point that the back cover is not provided with the film information check window 3. The same reference numerals will be assigned to members identical to those of the second embodiment. The description of the members will be omitted.

A back cover 2B of a camera of this embodiment is, like the back cover 2A of the second embodiment, pivoted by one lateral end of the backside of the camera body 1A so that the back cover can pivot freely. By opening or closing the back cover, the back cover is displaced from a closed state (state shown in FIG. 8), in which the opening in the backside of the camera body 1A is hidden, to an open state (state shown in FIG. 7), in which the opening is uncovered, or vice versa.

The back cover 2B is shaped substantially like a plate similar to the back cover 2A. One extreme portion of the back cover 2B is substantially curved so that it will be streamlined along the outer circumference of the mounted Patrone 6 formed when the back cover 2B is closed. The opening in the backside of the camera body 1A is hidden behind the back cover.

The elastic member 4A made of an elastic foaming material or the like is bonded to a given portion of the back cover 2B near the support shaft 2a, that is, to the inner wall surface of the back cover 2B, which is opposed to the Patrone stowage chamber 10 when the back cover 2B is closed, over an area from the curved portion 8 of the back cover 2B to the planar portion 7 thereof (See FIGS. 8 and 9).

A sheet member 5B that is a sheet type low-friction member offering a lower friction coefficient than the surface of the elastic member 4A is bonded in a united fashion only to the surface of the elastic member 4A, which meets the outer circumference of the projection 6a of the Patrone 6 in the course of closing the back cover 2B, that is, the surface of the planar portion 7 of the back cover 2B.

Even the third embodiment having the foregoing structure can provide the same advantages as the first and second embodiments.

Noted is that the back cover 2B of this embodiment is not provided with the film information check window unlike those of the first and second embodiments. It is therefore unnecessary to assign the role of a light interceptive means to the elastic member 4A and sheet member 5B. A raw material to be made into the elastic member 4 and sheet member 5, for example, an elastic foaming material or polyester need not be colored especially in black.

In other words, even when a locally procurable raw material is used to be made into the elastic member 4A and sheet member 5B, it can be used as it is in terms of color. Even when a black raw material is unavailable, the labor of coloring the material in black is obviated. This leads to a simplified manufacturing process. This embodiment can further contribute to minimization of manufacturing cost.

According to the present invention, it will be apparent that a wide range of different embodiments can be constructed based on the present invention without a departure from the spirit and scope of the present invention. The present invention will be limited to the appended claims but not restricted to any specific embodiments.

What is claimed is:

1. A camera, comprising:

a camera body;

a film Patrone stowage chamber defined in said camera body;

a cover member to be freely opened or closed relative to said camera body;

an elastic member attached to said cover member and when said cover member is closed relative to said camera body, opposed to said film Patrone stowage chamber; and a low-friction member attached to said elastic member, and when said cover member is closed with a film Patrone mounted in said film Patrone stowage chamber, meeting at least part of said film Patrone so as to press and slidably engage said film Patrone.

2. A camera, comprising:

a camera body;

a film Patrone stowage chamber defined in said camera body;

a cover member to be freely opened or closed relative to said camera body; and an elastic member having a surface thereof formed with a low-friction member, attached to said cover member, and when said cover member is closed with a film Patrone stowed in said film Patrone stowage chamber, pressing and slidably engaging said film Patrone.

3. A camera, comprising:

a camera body;

a stowage chamber defined in said camera body and used to stow a desired member;

a cover member to be freely opened or closed relative to said camera body; and an elastic member having a surface thereof formed with a low-friction member, attached to said cover member, and when said cover member is closed with said desired member stowed in said stowage chamber, pressing and slidably engaging said desired member.

4. A camera, comprising:

a camera body;

a stowage chamber defined in said camera body and used to stow a desired member;

a cover member to be freely opened or closed relative to said camera body;

an elastic member attached to said cover member, and when said cover member is closed relative to said camera body, opposed to said stowage chamber; and a low-friction member attached to said elastic member, and when said cover member is closed with said desired member stowed in said stowage chamber, meeting at least part of said member so as to press and slidably engage said desired member.

5. A camera, comprising:

a camera body;

a cover member to be freely opened or closed relative to said camera body, and composed of a planar portion and a curved portion substantially curved along an outer circumference of a film Patrone;

an elastic member attached to said cover member, and when said cover member is closed relative to said camera body, opposed to a film Patrone stowage chamber defined in said camera body; and a low-friction member attached to said elastic member lying over said planar portion of said cover member, and when said cover member is closed with a film Patrone mounted in said film Patrone stowage chamber, meeting at least part of said film Patrone so as to press and slidably engage the film Patrone.

6. A camera according to claim 1, 2, 3, 4, or 5, wherein the surface of said low-friction member offers a lower friction coefficient than the surface of said elastic member.

7. A camera according to claim 1, 2 or 5, wherein said low friction member is located on one side of said elastic member opposed to said film Patrone stowage chamber.

8. A camera according to claim 1, 2, 3, 4, or 5, wherein said low-friction member is made of a sheet type raw material.

9. A camera according to claim 1, 2, 3, 4, or 5, wherein said low-friction member is made of a sheet type raw material of polyester.

10. A camera according to claim 1, 2, 3, 4, or 5, wherein said elastic member is made of an elastic foam material.

11. A camera according to claim 1, 2, 3, 4, or 5, wherein said cover member is a back cover.

12. A camera according to claim 1, 2, 3, 4, or 5, wherein said elastic member and low-friction member are black.

13. A camera according to claim 3 or 4, wherein said stowage chamber is used to stow a film Patrone.

14. A camera, comprising:

a stowage chamber in which a film Patrone is stowed;

a cover member formed to hide said stowage chamber;

a deformation member attached to said cover member, and used to press a film Patrone stowed in said stowage chamber and forcibly bring the film Patrone to a given posture; and a sliding member placed on a surface of said deformation member in order to allow said film Patrone to rotate toward said given posture when pressed.

15. A camera according to claim 14, wherein said cover member and deformation member are provided with a through hole, and said deformation member is made of a material having the capability of a light interceptor.

16. A camera according to claim 15, wherein said through hole is provided with a photo-transparent window.

* * * * *